United States Patent
Yeo

(10) Patent No.: US 10,778,280 B2
(45) Date of Patent: Sep. 15, 2020

(54) OPERATION METHOD OF COMMUNICATION NODE IN NETWORK SUPPORTING LOW POWER COMMUNICATION

(71) Applicant: ELECTRONICS AND TELECOMMUNICATIONS RESEARCH INSTITUTE, Daejeon (KR)

(72) Inventor: Geon Min Yeo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 22 days.

(21) Appl. No.: 16/208,896

(22) Filed: Dec. 4, 2018

(65) Prior Publication Data
US 2019/0173523 A1   Jun. 6, 2019

(30) Foreign Application Priority Data

Dec. 6, 2017 (KR) .......... 10-2017-0167021
Nov. 20, 2018 (KR) .......... 10-2018-0151641

(51) Int. Cl.
| H04W 4/00 | (2018.01) |
| H04B 1/7156 | (2011.01) |
| H04B 1/7143 | (2011.01) |
| H04W 24/08 | (2009.01) |
| H04W 16/14 | (2009.01) |
| H04W 72/04 | (2009.01) |
| H04W 52/02 | (2009.01) |

(52) U.S. Cl.
CPC .......... *H04B 1/7156* (2013.01); *H04B 1/7143* (2013.01); *H04W 16/14* (2013.01); *H04W 24/08* (2013.01); *H04W 52/0229* (2013.01); *H04W 52/0274* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| 7,924,766 B2 * | 4/2011 | Sahinoglu ............. H04W 74/02 370/321 |
| 8,144,723 B2 | 3/2012 | Bar-Ness et al. |
| 8,331,311 B2 | 12/2012 | Lee et al. |
| 8,570,970 B2 * | 10/2013 | Hsu ........................ H04W 74/02 370/329 |
| 9,119,149 B2 | 8/2015 | Hwang et al. |
| 9,526,103 B2 | 12/2016 | Park |

(Continued)

*Primary Examiner* — Bob A Phunkulh
(74) *Attorney, Agent, or Firm* — LRK Patent Law Firm

(57) ABSTRACT

An operation method of a device in a communication system includes receiving from a reference node a beacon including configuration information of a downlink/uplink (DL/UL) slot in a super frame # n; confirming a position of the DL/UL slot configured in the super frame # n based on the configuration information; and performing at least one of a DL reception operation and a UL transmission operation in the DL/UL slot. Also, UL communication and DL communication are allowed in the DL/UL slot, and n is an integer equal to or greater than 0.

20 Claims, 5 Drawing Sheets

(56) References Cited

U.S. PATENT DOCUMENTS

| | | | |
|---|---|---|---|
| 2002/0105970 A1* | 8/2002 | Shvodian | H04W 16/14 370/468 |
| 2003/0063619 A1* | 4/2003 | Montano | H04L 29/12009 370/443 |
| 2009/0010210 A1* | 1/2009 | Hiertz | H04W 74/02 370/329 |
| 2009/0067389 A1* | 3/2009 | Lee | H04W 74/02 370/336 |
| 2009/0168744 A1* | 7/2009 | Park | H04W 74/006 370/349 |
| 2012/0127865 A1* | 5/2012 | Nakae | H04B 1/715 370/241 |
| 2012/0155279 A1* | 6/2012 | Ho | H04L 47/522 370/241 |
| 2014/0269633 A1* | 9/2014 | Behnamfar | H04L 5/0073 370/336 |
| 2014/0376375 A1 | 12/2014 | Joo | |
| 2016/0255625 A1* | 9/2016 | Kim | H04W 74/04 370/336 |
| 2016/0286341 A1 | 9/2016 | Lee et al. | |
| 2016/0374053 A1 | 12/2016 | Hareuveni et al. | |
| 2017/0142717 A1 | 5/2017 | Park | |
| 2017/0290050 A1* | 10/2017 | Yun | H04W 74/002 |
| 2018/0220443 A1* | 8/2018 | Kim | H04W 84/12 |
| 2018/0310233 A1* | 10/2018 | Li | H04W 48/16 |

* cited by examiner

OPERATION METHOD OF COMMUNICATION NODE IN NETWORK SUPPORTING LOW POWER COMMUNICATION

CROSS-REFERENCE TO RELATED APPLICATIONS

This application claims priority to Korean Patent Application Nos. 10-2017-0167021, filed Dec. 6, 2017, and 10-2018-0151641, filed Nov. 30, 2018, in the Korean Intellectual Property Office (KIPO), the entire contents of which are hereby incorporated by reference.

BACKGROUND

1. Field of the Invention

The present disclosure relates to a technique for lower power communication, and more specifically, to a synchronization method and a data unit transmission method for reducing power consumption.

2. Description of Related Art

With the development of information and communication technologies, various wireless communication technologies are being developed. The wireless communication technologies are broadly classified into wireless communication technologies using a licensed band and wireless communication technologies using an unlicensed band (e.g., an industrial scientific medical (ISM) band). Since a license of the licensed band is given exclusively to one operator, wireless communication technologies that use the licensed bands can provide better reliability and better communication quality than wireless communication technologies that use the unlicensed bands.

There are a long term evolution (LTE) system, a LTE-advanced system, a new radio (NR) system, or the like defined in the $3^{rd}$ generation partnership project (3GPP) as the typical wireless communication technologies using the licensed bands. Each base station and user equipment (UE) supporting the communication technologies defined in the 3GPP may transmit and receive signals through the licensed band. Also, there are a wireless local area network (WLAN) defined in the institute of electrical and electronics engineers (IEEE) 802.11, a wireless personal area network (WPAN) defined in the IEEE 802.15, or the like as the typical wireless communication technologies using the unlicensed bands. A communication node supporting WLAN or WPAN may transmit and receive signals through the unlicensed band.

Meanwhile, in the unlicensed band, communications may be performed according to a frequency hopping scheme, and a frequency hopping pattern may be pre-shared in communication nodes. For example, the communication node #1 is required to know an operation frequency band (e.g., a current operation frequency band according to the frequency hopping pattern) of the communication node #2 in order to perform communications. In order to identify the operation frequency band of the communication node #2, the communication node #1 may perform a channel monitoring operation, and power consumption may increase due to such the channel monitoring operation.

Also, a downlink (DL) slot for DL communication and an uplink (UL) slot for UL communication may be defined in the unlicensed band. Only DL communication may be allowed in the DL slot and only UL communication may be allowed in the UL slot. Even when a UL data unit occurs in a DL slot, the communication node is not able to transmit the UL data unit in the current DL slot, and the transmission of the UL data unit may be delayed to a UL slot after the DL slot. As a result, the power consumption of the communication node may increase.

SUMMARY

Accordingly, embodiments of the present disclosure provide a method and an apparatus for signaling information indicating an operation frequency band of a communication node in a communication system.

Accordingly, embodiments of the present disclosure also provide a method and an apparatus for transmitting a data unit in a slot where UL communication and DL communication are allowed in a communication system.

In order to achieve the objective of the present disclosure, an operation method of a device in a communication system may comprise receiving from a reference node a beacon including configuration information of a downlink/uplink (DL/UL) slot in a super frame # n; confirming a position of the DL/UL slot configured in the super frame # n based on the configuration information; and performing at least one of a DL reception operation and a UL transmission operation in the DL/UL slot, wherein UL communication and DL communication are allowed in the DL/UL slot, and n is an integer equal to or greater than 0.

The configuration information may include information indicating a start time of the DL/UL slot and information indicating a duration of the DL/UL slot.

The configuration information may include information indicating a valid period of the DL/UL slot, the DL/UL slot according to the configuration information may be configured in each of super frames from the super frame # n to a super frame # j indicated by the valid period, and j may be an integer greater than n.

When a DL data unit is not received in a predetermined period from a start time of the DL/UL slot, the UL transmission operation may be performed in the DL/UL slot.

When a DL data unit is not received in a predetermined period from a start time of the DL/UL slot and a UL data unit to be transmitted to the reference node is not present, the device may operate in a sleep mode until a beacon period in a super frame #(n+1) located after the super frame # n.

The DL/UL slot may be configured in a contention free period (CFP) of the super frame # n.

The operation method may further comprise receiving from the reference node a DL bitmap indicating whether a DL data unit is to be transmitted in the DL/UL slot, wherein the DL bitmap is received through the beacon or through a separate message after reception of the beacon.

When the DL bitmap indicates that a DL data unit is not to be transmitted in the DL/UL slot, the UL transmission operation may be performed in the DL/UL slot.

In order to achieve the objective of the present disclosure, an operation method of a reference node in a communication system may comprise generating a beacon including configuration information of a downlink/uplink (DL/UL) slot; transmitting the beacon in a beacon period in a super frame # n; and performing at least one of a DL transmission operation and a UL reception operation in the DL/UL slot indicated by the configuration information in the super frame # n, wherein UL communication and DL communication are allowed in the DL/UL slot, and n is an integer equal to or greater than 0.

The configuration information may include information indicating a start time of the DL/UL slot and information indicating a duration of the DL/UL slot.

The configuration information may include information indicating a valid period of the DL/UL slot, the DL/UL slot according to the configuration information may be configured in each of super frames from the super frame # n to a super frame # j indicated by the valid period, and j may be an integer greater than n.

The DL/UL slot may be configured in a contention free period (CFP) of the super frame # n.

The operation method may further comprise transmitting a DL bitmap indicating whether a DL data unit is to be transmitted in the DL/UL slot, wherein the DL bitmap is transmitted through the beacon or through a separate message after transmission of the beacon.

The operation method may further comprise transmitting a control signal including information indicating a frequency band in which the beacon was transmitted through a predetermined frequency band, wherein the control signal is transmitted after the beacon in the super frame # n, and the predetermined frequency band is different from the frequency band in which the beacon was transmitted In order to achieve the objective of the present disclosure, a device in a communication system may comprise a processor and a memory storing at least one instruction executed by the processor, and the at least one instruction may be configured to receive from a reference node a control signal indicating a frequency band # k in which a beacon #1 is transmitted, in a frequency band # m of a super frame # n; predict a frequency band # p in which a beacon #2 is to be transmitted in a super frame #(n+1) based on the frequency band # k and a predetermined frequency hopping pattern; receive from the reference node the beacon #2 including configuration information of a downlink/uplink (DL/UL) slot in the frequency band # p of the super frame #(n+1); identify a position of the DL/UL slot configured in the super frame #(n+1) based on the configuration information; and perform at least one of a DL reception operation and a UL transmission operation in the DL/UL slot, wherein UL communication and DL communication are allowed in the DL/UL slot, n is an integer equal to or greater than 0, and m and p are positive integers different from each other.

The configuration information may include information indicating a start time of the DL/UL slot, information indicating a duration of the DL/UL slot, and information indicating a valid period of the DL/UL slot, the DL/UL slot according to the configuration information may be configured in each of super frames from the super frame #(n+1) to a super frame # j indicated by the valid period, and j may be an integer greater than (n+1).

When a DL data unit is not received in a predetermined period from a start time of the DL/UL slot, the UL transmission operation may be performed in the DL/UL slot.

When a DL data unit is not received in a predetermined period from a start time of the DL/UL slot and a UL data unit to be transmitted to the reference node is not present, the device may operate in a sleep mode until a beacon period in a super frame #(n+2) located after the super frame #(n+1).

The at least one instruction may be further configured to receive from the reference node a DL bitmap indicating whether a DL data unit is to be transmitted in the DL/UL slot, wherein the DL bitmap is received through the beacon #2 or through a separate message after reception of the beacon #2.

When the DL bitmap indicates that a DL data unit is not to be transmitted in the DL/UL slot, the UL transmission operation may be performed in the DL/UL slot.

According to the embodiments of the present disclosure, the reference node may transmit a beacon based on a frequency hopping pattern, and then transmit, in a predetermined frequency band, a control signal including information indicating a frequency band in which the current beacon is transmitted after transmission of the beacon. The device that is not synchronized with the reference node may perform a monitoring operation in the predetermined frequency band to receive the control signal. When the control signal is received in the predetermined frequency band, the device may confirm the frequency band in which the beacon is transmitted based on the information included in the control signal, and communicate with the reference node based on the identified frequency band and the frequency hopping pattern. Therefore, the synchronization between the reference node and the device may be performed using the control signal instead of the beacon, so that the power consumption in the device can be reduced.

Also, a DL/UL slot in which DL communication and UL communication are allowed may be configured in the communication system. The device may perform a monitoring operation for reception of a DL data unit in a predetermined period of the DL/UL slot. When a DL data unit is not received in the predetermined period of the DL/UL slot, the device may transmit a UL data unit in the DL/UL slot. Therefore, the efficiency of resource use in the communication system can be improved, and thus the transmission delay of the data unit can be reduced.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
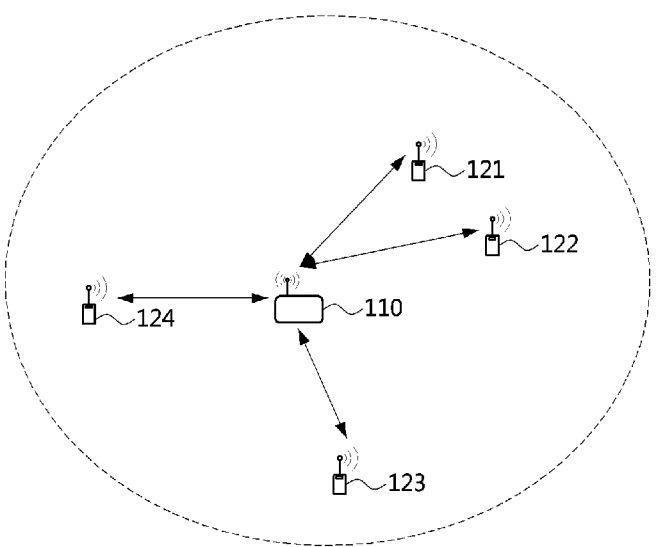
FIG. 1 is a conceptual diagram illustrating a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which embodiments according to the present disclosure are applied will be described. The communication system to which the embodiments according to the present disclosure are applied is not limited to the following description, and the embodiments according to the present disclosure may be applied to various communication systems. Here, the communication system may be used in the same sense as a communication network.

FIG. 1 is a conceptual diagram illustrating a first embodiment of a communication system.

Referring to FIG. 1, a communication system 100 may include a plurality of communication nodes 110, 121, 122, 123, and 124. The plurality of communication nodes 110, 121, 122, 123, and 124 may perform low power communications in a licensed band or an unlicensed band. When the plurality of communication nodes operate in the licensed band, they may support a narrowband-Internet of things (NB-IoT), a narrow band-cellular IoT (NB-CIoT), or an LTE machine type communication (LTE-MTC). When the plurality of communication nodes operate in the unlicensed band, they may support a low power wide area network (LPWAN), a SigFox, a LoRa, or an Ingenu. The plurality of communication nodes 110, 121, 122, 123, and 124 operating in the unlicensed band may operate in a carrier-sense multiple access with collision avoidance (CSMA/CA) scheme. Each of the plurality of communication nodes 110, 121, 122, 123, and 124 may have the following structure.

Figure 2:
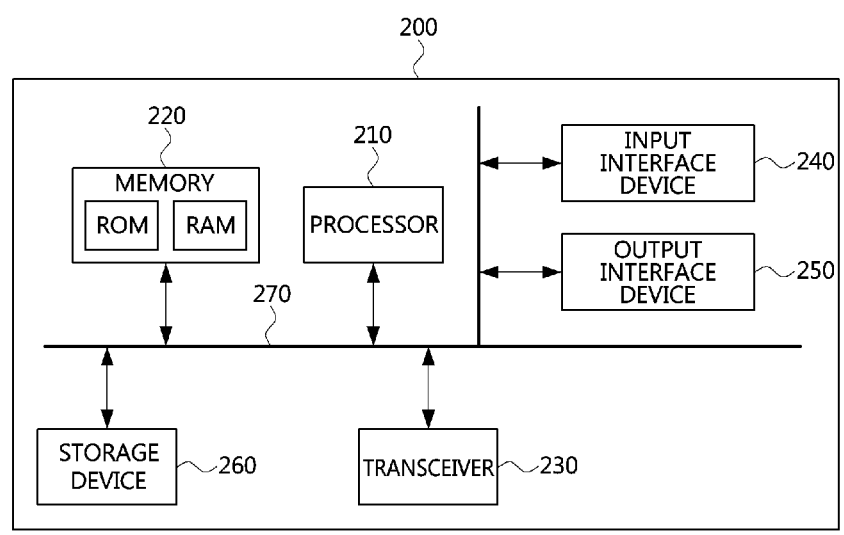
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the plurality of communication nodes 110, 121, 122, 123, and 124 operating in the unlicensed band may perform communications using super frames. The super frames may be configured as follows.

Figure 3:
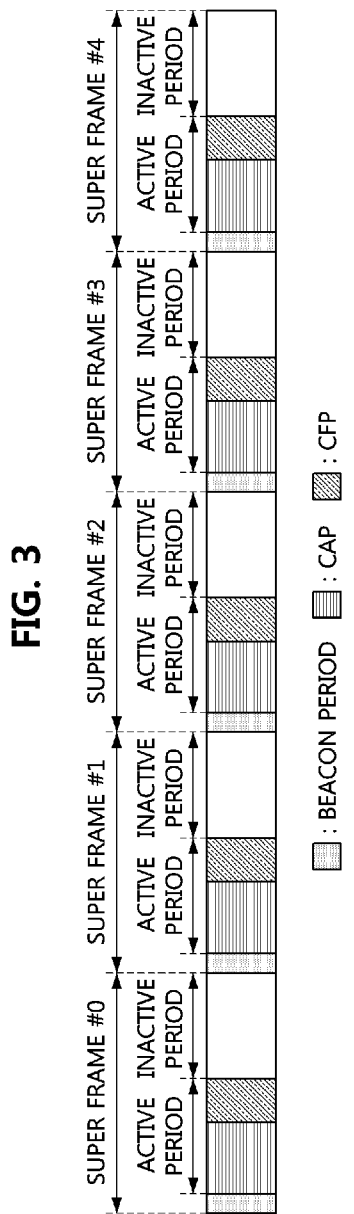
FIG. 3 is a block diagram illustrating a first embodiment of a super frame in a communication system.

FIG. 3 is a block diagram illustrating a first embodiment of a super frame in a communication system.

Referring to FIG. 3, the super frames may be consecutive on the time axis. Each of the super frames #0 to #4 may include a beacon period, an active period, and an inactive period. The active period may include a contention access period (CAP) and a contention free period (CFP).

The reference node 110 shown in FIG. 1 may transmit beacons in the beacon periods of the super frames #0 to #4. The cycle of transmitting the beacon (beacon transmission cycle) may be configured in units of super frames. For example, when the cycle of transmitting the beacon corresponds to one super frame, the beacon may be transmitted every super frame. When the cycle of transmitting the beacon corresponds to 2 super frames, the beacon may be transmitted in the super frames #0, #2, #4, and the like.

The beacon may be transmitted in a broadcasting manner, and may comprise information needed for communication (e.g., a frequency band in which the beacon is transmitted, a frequency hopping pattern, a frequency hopping cycle, etc.). The devices 121 to 124 shown in FIG. 1 may receive the beacon from the reference node 110, and may perform communication based on the information included in the beacon. The communications between the plurality of communication nodes 110, 121, 122, 123, and 124 may be performed in the active period of each of the super frames #0 to #4. Here, the reference node 110 may be referred to as an access point (AP), a gateway, or a coordinator, and each of the devices 121 to 124 may be referred to as an end-device, an end-node, or a station.

The plurality of communication nodes 110, 121, 122, 123, and 124 may operate according to a frequency hopping scheme. The frequency hopping pattern and period may be pre-shared at the plurality of communication nodes 110, 121, 122, 123, and 124. One super frame may be transmitted in the same frequency band, and the frequency band in which the super frame is transmitted may be changed according to a predetermined frequency hopping pattern and period.

Figure 4:
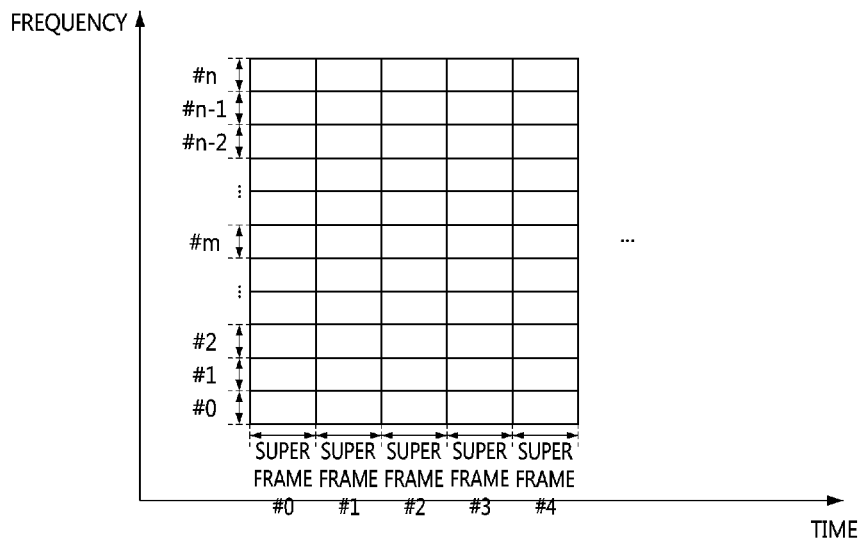
FIG. 4 is a conceptual diagram illustrating a first embodiment of frequency bands in a communication system.

FIG. 4 is a conceptual diagram illustrating a first embodiment of frequency bands in a communication system.

Referring to FIG. 4, the plurality of communication nodes 110, 121, 122, 123, and 124 may perform communications in frequency bands #0 to # n. Here, n may be an integer of 2 or more, and m may be an integer of 2 or less. For example, when the frequency hopping pattern is (2, 0, n, n−2, m), the super frame #0 may be transmitted in the frequency band #2, the super frame #1 may be transmitted in the frequency band #0, the super frame #2 may be transmitted in the frequency band # n, the super frame #3 may be transmitted in the frequency band #(n−2), and the super frame #4 may be transmitted in the frequency band # m.

In order to communicate with the reference node 110, the devices 121 to 124 are required to know the frequency band in which the beacon is transmitted. For this, the devices 121 to 124 may perform monitoring operations in a specific frequency band to receive the beacon. In the case where the beacon transmission cycle is long in the specific frequency band, the devices 121 to 124 are required to perform the monitoring operation for a long time. In this case, the power consumption of the devices 121 to 124 may increase.

Meanwhile, a DL slot for DL communication and a UL slot for UL communication may be defined in the super frame. Only DL communication may be allowed in the DL slot and only UL communication may be allowed in the UL slot. Even when a UL data unit occurs in the DL slot, the devices 121 to 124 cannot transmit the UL data unit in the current DL slot, and the transmission of the UL data unit is delayed until a UL slot after the DL slot. As a result, the power consumption of the devices 121 to 124 may increase.

Hereinafter, operation methods of a communication node for power saving in the communication system will be described. Even when a method (e.g., transmission or reception of a signal) to be performed at the first communication node among the communication nodes is described, the corresponding second communication node may perform a method (e.g., reception or transmission of the signal) corresponding to the operation of the first communication node. That is, when an operation of a device is described, a corresponding reference node may perform an operation corresponding to the operation of the device. Conversely, when an operation of a reference node is described, a corresponding device may perform an operation corresponding to the operation of the reference node.

Figure 5:
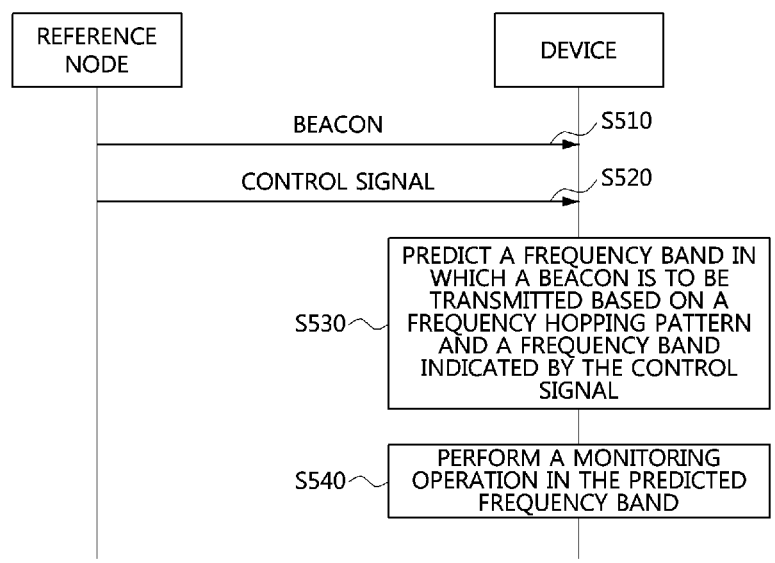
FIG. 5 is a sequence chart illustrating a first embodiment of a synchronization method in a communication system.
Figure 6:
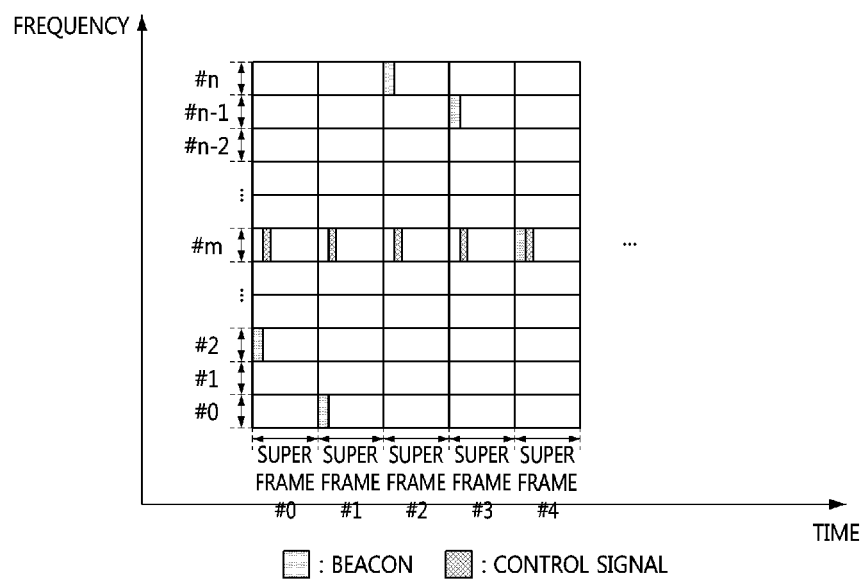
FIG. 6 is a conceptual diagram illustrating a beacon and a control signal transmitted according to the synchronization method illustrated in FIG. 5.

FIG. 5 is a sequence chart illustrating a first embodiment of a synchronization method in a communication system, and FIG. 6 is a conceptual diagram illustrating a beacon and a control signal transmitted according to the synchronization method illustrated in FIG. 5.

Referring to FIGS. 5 and 6, a communication system may comprise a reference node (i.e., the reference node 110 shown in FIG. 1) and a device (i.e., one of the devices 121 to 124 shown in FIG. 1). Each of the reference node and the device may be configured to be the same as or similar to the communication node 200 shown in FIG. 2. The reference node and the device may operate in accordance with a frequency hopping scheme, and frequency hopping information (e.g., frequency hopping pattern and period) may be pre-shared at the reference node and the device. Here, the frequency hopping pattern may be (2, 0, n, n−1, m), and the frequency hopping period may be 5 super frames.

The reference node may transmit a beacon according to the frequency hopping pattern and the frequency hopping period (S510). For example, the reference node may transmit a beacon in the frequency band #2 in the super frame #0, a beacon in the frequency band #0 in the super frame #1, a beacon in the frequency band # n in the super frame #2, a beacon in the frequency band #(n−1) in the super frame #3, and a beacon in the frequency band # m in the super frame #4. Here, each of n and m may be a positive integer.

Further, after transmitting the beacon, the reference node may transmit a control signal in the super frame in which the beacon is transmitted (S520). The control signal may be transmitted immediately after transmission of the beacon. Alternatively, the control signal may be transmitted after a guard interval from the transmission end point of the beacon. For example, the control signal may be transmitted in the CAP, the CFP, or the inactive period within the super frame. When the control signal is transmitted in the CFP within the super frame, the first symbol of the CFP may be used for transmission of the control signal. The control signal may include information indicating the frequency band in which the beacon was transmitted in the super frame to which the control signal belongs. For example, the control signal may be configured as follows.

Figure 7:
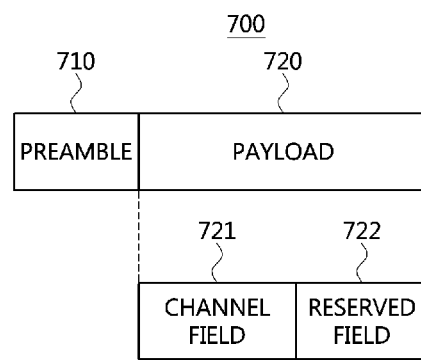
FIG. 7 is a block diagram illustrating a first embodiment of a control signal in a communication system.

FIG. 7 is a block diagram illustrating a first embodiment of a control signal in a communication system.

Referring to FIG. 7, a control signal 700 may comprise a preamble 710 and a payload 720, and the payload 720 may include a channel field 721 and a reserved field 722. The channel field 721 may include information indicating the frequency band in which the beacon was transmitted within the super frame to which the control signal 700 belongs. The reserved field 722 may include at least one of information indicating a center frequency, information indicating a coding rate, and a spreading factor.

Referring to FIGS. 5 and 6, the reference node may transmit the control signal in a predetermined frequency band. The predetermined frequency band may be shared by the reference node and the device. When the predetermined frequency band is the frequency band # m, the reference node may transmit the control signal in the frequency band # m. For example, in the super frame #0, the reference node may transmit the beacon in the frequency band #2 and then the control signal in the frequency band # m. The control signal transmitted in the frequency band # m of the super frame #0 may include information indicating the frequency band #2 in which the beacon was transmitted.

In the super frame #1, the reference node may transmit the beacon in the frequency band #0 and then the control signal in the frequency band # m. The control signal transmitted in the frequency band # m of the super frame #1 may include information indicating the frequency band #0 in which the beacon was transmitted. In the super frame #2, the reference node may transmit the beacon in the frequency band # n and then the control signal in the frequency band # m. The control signal transmitted in the frequency band # m of the super frame #2 may include information indicating the frequency band # n in which the beacon was transmitted.

In the super frame #3, the reference node may transmit the beacon in the frequency band #(n−1) and then the control signal in the frequency band # m. The control signal transmitted in the frequency band # m of the super frame #3 may include information indicating the frequency band #(n−1) in which the beacon was transmitted. In the super frame #4, the reference node may transmit the beacon in the frequency band # m and then the control signal in the frequency band # m. The control signal transmitted in the frequency band # m of the super frame #4 may include information indicating the frequency band # m in which the beacon was transmitted. Alternatively, when the frequency band in which the control signal is transmitted within one super frame is the same as the frequency band in which the beacon was transmitted, the transmission of the control signal may be omitted. That is, the transmission of the control signal in the super frame #4 may be omitted.

On the other hand, a device that is not synchronized with the reference node may perform a monitoring operation in the predetermined frequency band (e.g., the frequency band # m) to receive a beacon or a control signal. For example, when the monitoring operation is performed in the frequency band # m of the super frame #0, the device may not receive the beacon but may receive the control signal. Upon receiving the control signal from the reference node, the device may confirm the frequency band #2 in which the beacon was transmitted in the super frame #0 based on the information included in the control signal. The device may predict a frequency band in which the beacon is to be transmitted in the super frame #1 based on the frequency hopping pattern and the frequency band #2 in which the beacon was transmitted in the super frame #0 (S530).

When the frequency hopping pattern is (2, 0, n, n−1, m), the device may predict that the beacon is to be transmitted in the frequency band #0 of the super frame #1. Accordingly, the device may change its operation frequency band from the frequency band # m to the frequency band #0, and perform a monitoring operation in the frequency band #0 of the super frame #1 (S540). In this case, the device may receive the beacon of the reference node in the frequency band #0 of the super frame #1, and may identify the information included in the beacon. The device may also be synchronized to the reference node using the information included in the beacon.

On the other hand, when the device that is not synchronized with the reference node starts the monitoring operation in the frequency band # m of the super frame #4 in order to receive a beacon or a control signal, the device may receive a beacon first than a control signal. In this case, the device may identify the information included in the beacon and be synchronized to the reference node using the information included in the beacon.

Figure 8:
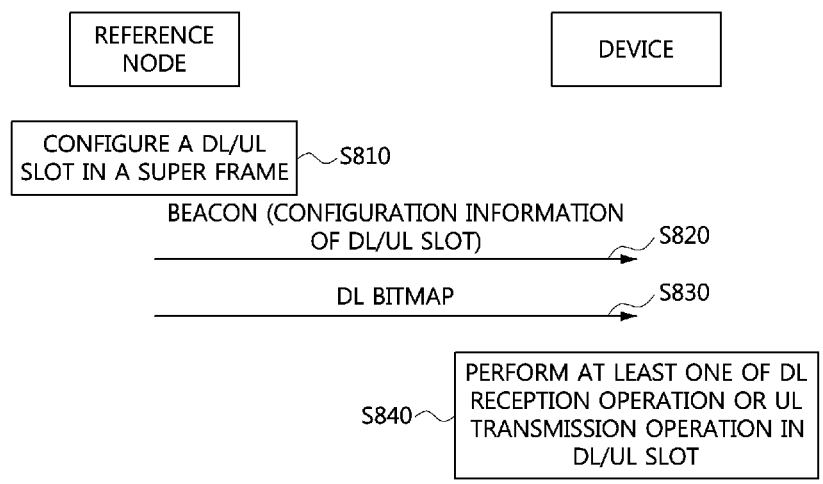
FIG. 8 is a sequence chart illustrating a first embodiment of a method for DL and UL transmissions through a DL/UL slot in a communication system.
Figure 9:
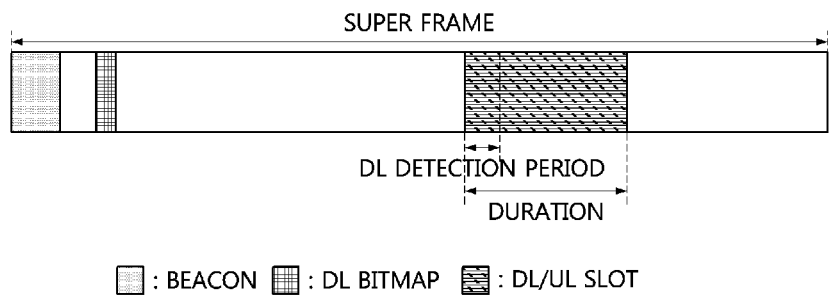
FIG. 9 is a block diagram illustrating a first embodiment of a super frame including a DL/UL slot in a communication system.

FIG. 8 is a sequence chart illustrating a first embodiment of a method for DL and UL transmissions through a DL/UL slot in a communication system, and FIG. 9 is a block diagram illustrating a first embodiment of a super frame including a DL/UL slot in a communication system.

Referring to FIGS. 8 and 9, a communication system may comprise a reference node (i.e., the reference node 110 shown in FIG. 1) and a device (i.e., one of the devices 121 to 124 shown in FIG. 1). Each of the reference node and the device may be configured to be the same as or similar to the communication node 200 shown in FIG. 2. The reference node and the device may operate in accordance with a frequency hopping scheme, and frequency hopping information (e.g., frequency hopping pattern and period) may be pre-shared at the reference node and the device.

The reference node may configure a DL/UL slot within a super frame (S810). The DL/UL slot may be used for DL transmission and UL transmission. The DL/UL slot may be configured within the CAP, the CFP, or the inactive period within the super frame. The reference node may transmit a beacon including configuration information of the DL/UL slot (S820). The configuration information of the DL/UL slot may include a start time of the DL/UL slot (e.g., a start symbol index), a duration of the DL/UL slot, a valid period of the DL/UL slot, and a DL detection period.

The duration of the DL/UL slot may indicate the length from the beginning of the DL/UL slot, and the valid period of the DL/UL slot may indicate the number of consecutive super frames in which the DL/UL slot is present. For example, if the valid period of the DL/UL slot indicated by the beacon frame transmitted through the super frame #0 indicates 3 super frames, the DL/UL slot may be configured in the super frames #0 to #3. The DL detection period may indicate a period during which a monitoring operation for receiving a DL data unit is performed in the DL/UL slot. The DL detection period may start from the start time of the DL/UL slot and may be configured to be shorter than the duration of the DL/UL slot.

Also, the reference node may transmit a DL bitmap indicating whether DL transmission is performed in the DL/UL slot (S830). The DL bitmap may be included in the beacon. Alternatively, the DL bitmap may be transmitted via a message other than the beacon. When the size of the DL bitmap is 1 bit, the DL bitmap set to '0' may indicate that DL transmission is not to be performed in the DL/UL slot, and the DL bitmap set to '1' may indicate that DL transmission is to be performed in the DL/UL slot. For example, when a DL bitmap set to '0' is transmitted in the super frame #0, the corresponding DL bitmap may indicate that DL transmission is not to be performed in the DL/UL slot in the super frame #0. When a DL bitmap set to '1' is transmitted in the super frame #2, the corresponding DL bitmap may indicate that DL transmission is to be performed in the DL/UL slot in the super frame #2.

Meanwhile, the device may receive the beacon from the reference node and identify the configuration information of the DL/UL slot included in the beacon. The device may perform at least one of a DL communication operation and a UL communication operation in the DL/UL slot (S840). For example, the device may perform a monitoring operation to receive a DL data unit in the DL detection period in the DL/UL slot. When a DL data unit is detected in the DL detection period, the device may receive the DL data unit in the DL/UL slot.

On the other hand, when a DL data unit is not detected in the DL detection period, the device having a UL data unit may transmit the UL data unit to the reference node in the remaining period of the DL/UL slot. Alternatively, when a DL data unit is not detected in the DL detection period and there is no UL data unit, the device may operate in a sleep mode until the beacon period of the next super frame.

Meanwhile, when the DL bitmap as well as the DL/UL slot are received from the reference node, the device may confirm whether a DL data unit is to be transmitted in the DL/UL slot based on the DL bitmap. When it is determined that a DL data unit is to be transmitted in the DL/UL slot, the device may perform a monitoring operation to receive the DL data unit in the DL/UL slot. On the other hand, when it is determined that a DL data unit is not to be transmitted in the DL/UL slot and a UL data unit exists, the device may transmit the UL data unit to the reference node in the DL/UL slot. Alternatively, when it is determined that a DL data unit is not to be transmitted in the DL/UL slot and a UL data unit is not present, the device may operate in a sleep mode until the beacon period of the next super frame.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a device in a communication system, the operation method comprising:
    receiving from a reference node a beacon including configuration information of a downlink/uplink (DL/UL) slot in a super frame # n;
    confirming a position of the DL/UL slot configured in the super frame # n based on the configuration information; and
    performing at least one of a DL reception operation and a UL transmission operation in the DL/UL slot,
    wherein UL communication and DL communication are allowed in the DL/UL slot, and n is an integer equal to or greater than 0,
    wherein the configuration information includes information indicating a valid period of the DL/UL slot, and the information indicating the valid period of the DL/UL slot indicates a number of consecutive super frames in which the DL/UL slot is present.

2. The operation method according to claim 1, wherein the configuration information includes information indicating a start time of the DL/UL slot and information indicating a duration of the DL/UL slot.

3. The operation method according to claim 1, the DL/UL slot according to the configuration information is configured in each of super frames from the super frame # n to a super frame # j indicated by the valid period, and j is an integer greater than n.

4. The operation method according to claim 1, wherein, when a DL data unit is not received in a predetermined period from a start time of the DL/UL slot, the UL transmission operation is performed in the DL/UL slot.

5. The operation method according to claim 1, wherein, when a DL data unit is not received in a predetermined period from a start time of the DL/UL slot and a UL data unit to be transmitted to the reference node is not present, the device operates in a sleep mode until a beacon period in a super frame #(n+1) located after the super frame # n.

6. The operation method according to claim 1, wherein the DL/UL slot is configured in a contention free period (CFP) of the super frame # n.

7. The operation method according to claim 1, further comprising receiving from the reference node a DL bitmap indicating whether a DL data unit is to be transmitted in the DL/UL slot, wherein the DL bitmap is received through the beacon or through a separate message after reception of the beacon.

8. The operation method according to claim 7, wherein, when the DL bitmap indicates that a DL data unit is not to be transmitted in the DL/UL slot, the UL transmission operation is performed in the DL/UL slot.

9. An operation method of a reference node in a communication system, the operation method comprising:
    generating a beacon including configuration information of a downlink/uplink (DL/UL) slot;
    transmitting the beacon in a beacon period in a super frame # n; and
    performing at least one of a DL transmission operation and a UL reception operation in the DL/UL slot indicated by the configuration information in the super frame # n,
    wherein UL communication and DL communication are allowed in the DL/UL slot, and n is an integer equal to or greater than 0,
    wherein the configuration information includes information indicating a valid period of the DL/UL slot, and the information indicating the valid period of the DL/UL slot indicates a number of consecutive super frames in which the DL/UL slot is present.

10. The operation method according to claim 9, wherein the configuration information includes information indicating a start time of the DL/UL slot and information indicating a duration of the DL/UL slot.

11. The operation method according to claim 9, wherein the DL/UL slot according to the configuration information is configured in each of super frames from the super frame # n to a super frame # j indicated by the valid period, and j is an integer greater than n.

12. The operation method according to claim 9, wherein the DL/UL slot is configured in a contention free period (CFP) of the super frame # n.

13. The operation method according to claim 9, further comprising transmitting a DL bitmap indicating whether a DL data unit is to be transmitted in the DL/UL slot, wherein the DL bitmap is transmitted through the beacon or through a separate message after transmission of the beacon.

14. The operation method according to claim 9, further comprising transmitting a control signal including information indicating a frequency band in which the beacon was transmitted through a predetermined frequency band, wherein the control signal is transmitted after the beacon in the super frame # n, and the predetermined frequency band is different from the frequency band in which the beacon was transmitted.

15. A device in a communication system, the device comprising a processor and a memory storing at least one instruction executed by the processor, wherein the at least one instruction is configured to:
   receive from a reference node a control signal indicating a frequency band # k in which a beacon #1 is transmitted, in a frequency band # m of a super frame # n;
   predict a frequency band # p in which a beacon #2 is to be transmitted in a super frame #(n+1) based on the frequency band # k and a predetermined frequency hopping pattern;
   receive from the reference node the beacon #2 including configuration information of a downlink/uplink (DL/UL) slot in the frequency band # p of the super frame #(n+1);
   identify a position of the DL/UL slot configured in the super frame #(n+1) based on the configuration information; and
   perform at least one of a DL reception operation and a UL transmission operation in the DL/UL slot,
   wherein UL communication and DL communication are allowed in the DL/UL slot, n is an integer equal to or greater than 0, and m and p are positive integers different from each other,
   wherein the configuration information includes information indicating a valid period of the DL/UL slot, and the information indicating the valid period of the DL/UL slot indicates a number of consecutive super frames in which the DL/UL slot is present.

16. The device according to claim 15, wherein the configuration information further includes information indicating a start time of the DL/UL slot, information indicating a duration of the DL/UL slot, and the DL/UL slot according to the configuration information is configured in each of super frames from the super frame #(n+1) to a super frame # j indicated by the valid period, and j is an integer greater than (n+1).

17. The device according to claim 15, wherein, when a DL data unit is not received in a predetermined period from a start time of the DL/UL slot, the UL transmission operation is performed in the DL/UL slot.

18. The device according to claim 15, wherein, when a DL data unit is not received in a predetermined period from a start time of the DL/UL slot and a UL data unit to be transmitted to the reference node is not present, the device operates in a sleep mode until a beacon period in a super frame #(n+2) located after the super frame #(n+1).

19. The device according to claim 15, wherein the at least one instruction is further configured to receive from the reference node a DL bitmap indicating whether a DL data unit is to be transmitted in the DL/UL slot, wherein the DL bitmap is received through the beacon #2 or through a separate message after reception of the beacon #2.

20. The device according to claim 19, wherein, when the DL bitmap indicates that a DL data unit is not to be transmitted in the DL/UL slot, the UL transmission operation is performed in the DL/UL slot.

* * * * *